(12) United States Patent
Lömker

(10) Patent No.: US 11,085,277 B2
(45) Date of Patent: Aug. 10, 2021

(54) SEAMLESS STEEL PIPE, METHOD OF PRODUCING A HIGH STRENGTH SEAMLESS STEEL PIPE, USAGE OF A SEAMLESS STEEL PIPE AND PERFORATION GUN

(71) Applicant: Benteler Steel/Tube GmbH, Paderborn (DE)

(72) Inventor: André Lömker, Velbert (DE)

(73) Assignee: Benteler Steel/Tube GmbH

( * ) Notice: Subject to any disclaimer, the term of this patent is extended or adjusted under 35 U.S.C. 154(b) by 1050 days.

(21) Appl. No.: 14/877,578

(22) Filed: Oct. 7, 2015

(65) Prior Publication Data

US 2017/0101693 A1   Apr. 13, 2017

(51) Int. Cl.
| | | |
|---|---|---|
| *E21B 43/116* | (2006.01) | |
| *C21D 9/14* | (2006.01) | |
| *C21D 1/42* | (2006.01) | |
| C22C 38/22 | (2006.01) | |
| C22C 38/04 | (2006.01) | |
| C22C 38/02 | (2006.01) | |
| *E21B 43/117* | (2006.01) | |

(52) U.S. Cl.
CPC ............ *E21B 43/116* (2013.01); *C21D 1/42* (2013.01); *C21D 9/14* (2013.01); *C22C 38/02* (2013.01); *C22C 38/04* (2013.01); *C22C 38/22* (2013.01); *E21B 43/117* (2013.01); *Y02P 10/253* (2015.11)

(58) Field of Classification Search
CPC .. C21D 1/42; C21D 9/14; C22C 38/02; C22C 38/04; C22C 38/22; E21B 43/116
USPC ........................................... 148/590; 420/105
See application file for complete search history.

(56) References Cited

U.S. PATENT DOCUMENTS

| | | | | |
|---|---|---|---|---|
| 6,464,019 B1* | 10/2002 | Werner | ................ | E21B 43/117 |
| | | | | 102/307 |
| 9,903,008 B2 | 2/2018 | Niikura et al. | | |
| 2010/0193085 A1* | 8/2010 | Garcia | ..................... | C21D 9/08 |
| | | | | 148/508 |
| 2012/0211131 A1* | 8/2012 | Altschuler | ................ | C21D 1/25 |
| | | | | 148/593 |
| 2012/0211132 A1* | 8/2012 | Altschuler | ................ | C21D 1/25 |
| | | | | 148/593 |
| 2016/0305192 A1* | 10/2016 | Buhler | .................. | C21D 8/065 |

* cited by examiner

*Primary Examiner* — Caroline N Butcher
(74) *Attorney, Agent, or Firm* — Pandiscio & Pandiscio

(57) ABSTRACT

A perforation gun comprising a charging unit and an outer hollow carrier, wherein the hollow carrier is made of a seamless steel pipe, wherein the seamless steel pipe is produced by tempering a tubular steel body at a holding temperature of >450° C., the seamless steel pipe having a high burst strength and at least over part of its length having a yield strength Rp0.2 of >1050 MPa, and the seamless steel pipe having a grain structure with an average grain size of <15 μm, and the tubular steel body having been manufactured from a steel alloy, which steel alloy comprises, besides iron and inevitable impurities, the following alloying elements in mass-%:
C 0.22-0.30%
Mn 0.7-1.2%
Si 0.13-0.38%
Cr 0.7-1.2%
Mo 0.5-0.8%.

10 Claims, 1 Drawing Sheet

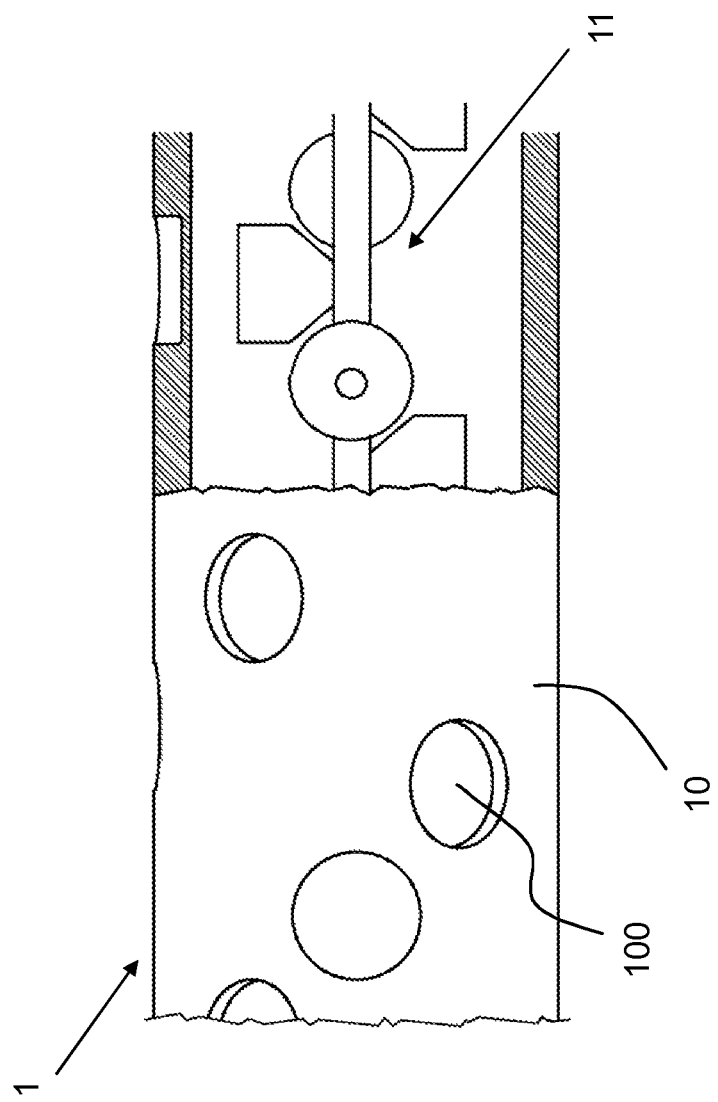

SEAMLESS STEEL PIPE, METHOD OF PRODUCING A HIGH STRENGTH SEAMLESS STEEL PIPE, USAGE OF A SEAMLESS STEEL PIPE AND PERFORATION GUN

FIELD OF THE INVENTION

The present invention relates to a seamless steel pipe, method of producing a high strength seamless steel pipe, usage of a seamless steel pipe and perforation gun.

BACKGROUND OF THE INVENTION

In particular the invention relates to a seamless steel pipe for use in cases where internal pressure is at least temporarily applied, a method of producing such a seamless steel pipe as well as the usage of such a seamless steel pipe, and a perforation gun having a hollow carrier made of such a seamless steel pipe.

High strength seamless steel pipes are employed in various applications. In particular, for applications, where internal pressure will be applied to the seamless steel pipe, such as by ignition of explosive charges within the steel pipe, the seamless steel pipes have to provide a high bursting strength.

One application of high strength seamless steel pipes is in perforation units for the oil industry. Perforation units are also referred to as perforating guns and are used for opening or renewed opening of boreholes for exploration of liquid or gaseous energy carriers, for example for exploration of gas or crude oil. Perforation units comprise a hollow carrier which accommodates a charging unit, which comprises explosive elements.

While the perforation gun is brought into position, for example lowered to and positioned in the region of the oil-carrying layer, the hollow carrier must withstand high mechanical stress in the form of high pressure and elevated temperatures.

Therefore the material of which the hollow carrier is made of has to have high strength.

Today the highest target quality for perforation guns, and in particular the hollow carriers of perforation guns is grade 155 ksi (kilo-pound-force per square inch with 1 ksi=6.895 MPa). These grades compare to minimum yield strength of approximately 1.000 MPa, which is the measure or classification of perforation guns. In order to prevent the collapse of the perforation unit and in particular the hollow carrier, even higher grades will be necessary. For example, for perforation of offshore areas in the oil field industry where the sea depth may for example be 3,000 meters, such as for example in the Gulf of Mexico, temperatures and pressure of 200° C. and 200 bar may occur. Thus higher grades may be required.

After positioning of the perforation gun that means during the actual use of the perforation unit, high internal pressures develops, when the explosive charges ignite. Therefore the hollow carrier of the perforation gun has to have a high toughness and in particular a transverse notch impact toughness in order to prevent the hollow carrier from bursting.

The material to be used for hollow carriers must therefore exhibit a high strength and, at the same time, must have a good toughness.

One object of the present invention is thus to provide a seamless steel pipe for use in cases where internal pressure is applied. Another object is to provide a method of producing a high strength seamless steel pipe. Yet another object of the present invention is to provide the usage of a seamless steel pipe as an outer pipe of a perforation unit. Finally, it is an object of the present invention to provide a perforation gun having such a seamless steel pipe as outer pipe. In all objects, the seamless steel pipe should have strength and toughness behaviors which are suited for the desired application.

In particular, the seamless steel pipe shall have high yield strength and at the same time have a sufficient toughness, so that the seamless steel pipe can be used for applications where high internal pressure is applied, for example, as hollow carriers of perforation guns for the above mentioned offshore conditions.

SUMMARY OF THE INVENTION

These objects are solved by a seamless steel pipe, its manufacturing process as well as usage of a seamless steel pipe and a perforation gun having a hollow carrier made of such a seamless steel pipe.

In one preferred form of the present invention, there is provided a seamless steel pipe for use in cases where internal pressure is applied, the seamless steel pipe having been produced by tempering a tubular steel body at a holding temperature of >450° C., the seamless steel pipe having a length extending between a first end and a second end, the seamless steel pipe having a high burst strength and at least over part of the length having a yield strength Rp0.2 of >1050 MPa, and the seamless steel pipe having a grain structure with an average grain size of <15 µm, and the tubular steel body having been manufactured from a steel alloy, which steel alloy comprises, besides iron and inevitable impurities, the following alloying elements in mass-%:

C 0.22-0.30%
Mn 0.7-1.2%
Si 0.13-0.38%
Cr 0.7-1.2%
Mo 0.5-0.8%.

In another preferred form of the present invention, there is provided a method of producing a high strength seamless steel pipe, the seamless steel pipe having at least over part of the length a yield strength Rp0.2>1050 MPa, the method comprising:

preparing a seamless tubular steel body of a steel alloy comprising, besides iron and inevitable impurities, the following alloying elements in mass-%:

C 0.22-030%
Mn 0.7-1.2%
Si 0.13-0.38%
Cr 0.7-1.2%
Mo 0.5-0.8%; and heat treating the tubular steel body with a holding temperature during tempering of >450° C.;

wherein the seamless steel pipe has a grain structure after heat treatment with an average grain size of <15 µm.

In another preferred form of the present invention, there is provided usage of a seamless steel pipe as an outer pipe of perforation guns, in particular a hollow carrier of perforation guns, the seamless steel pipe having been produced by tempering a tubular steel body at a holding temperature of >450° C., the seamless steel pipe having a length extending between a first end and a second end, the seamless steel pipe having a high burst strength and at least over part of the length having a yield strength Rp0.2 of >1050 MPa, and the seamless steel pipe having a grain structure with an average grain size of <15 µm, and the tubular steel body having been manufactured from a steel alloy, which steel alloy comprises, besides iron and inevitable impurities, the following alloying elements in mass-%:

C 0.22-0.30%
Mn 0.7-1.2%
Si 0.13-0.38%
Cr 0.7-1.2%
Mo 0.5-0.8%.

In another preferred form of the present invention, there is provided a perforation gun for perforation of borehole casings comprising a charging unit and an outer hollow carrier enclosing the charging unit, characterized in that the hollow carrier is made of a seamless steel pipe, wherein the seamless steel pipe having been produced by tempering a tubular steel body at a holding temperature of >450° C., the seamless steel pipe having a length extending between a first end and a second end, the seamless steel pipe having a high burst strength and at least over part of the length having a yield strength Rp0.2 of >1050 MPa, and the seamless steel pipe having a grain structure with an average grain size of <15 µm, and the tubular steel body having been manufactured from a steel alloy, which steel alloy comprises, besides iron and inevitable impurities, the following alloying elements in mass-%:

C 0.22-0.30%
Mn 0.7-1.2%
Si 0.13-0.38%
Cr 0.7-1.2%
Mo 0.5-0.8%.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 1 is a schematic view of a perforation gun in the area of a hollow carrier formed in accordance with the present invention.

DETAILED DESCRIPTION OF THE PREFERRED EMBODIMENTS

According to the first aspect of the invention, a seamless steel pipe for use in cases where internal pressure is applied is provided, the seamless steel pipe having been produced by tempering a tubular steel body at a holding temperature of >450° C., the seamless steel pipe having a length extending between a first end and a second end, the seamless steel pipe having a high burst strength and at least over part of the length having a yield strength Rp0.2 of >1050 MPa, and the seamless steel pipe having a grain structure with an average grain size of <15 µm, and the tubular steel body having been manufactured from a steel alloy, which steel alloy comprises, besides iron and inevitable impurities, the following alloying elements in mass-%:

C 0.22-0.30%
Mn 0.7-1.2%
Si 0.13-0.38%
Cr 0.7-1.2%
Mo 0.5-0.8%.

The seamless steel pipe is manufactured from a steel alloy. In particular, a seamless tubular steel body made of the steel alloy is produced and a seamless steel pipe is made from this seamless tubular body which consists of this steel alloy.

The steel alloy comprises, besides iron and inevitable impurities, the following alloying elements in mass-%:

C 0.22-0.30%
Mn 0.7-1.2%
Si 0.13-0.38%
Cr 0.7-1.2%
Mo 0.5-0.8%.

Any amounts of alloying elements which are given in percent are amounts in percent by mass, even if it is not explicitly stated.

Inevitable impurities are in particular impurities which are derived from the smelting process and alloying process of the steel alloy.

Carbon (C) is added as it increases the strength of the steel alloy. In particular, the formation of martensite can be positively influenced by the addition of carbon. As the addition of carbon in a larger amount may, however, result in a decrease of notch impact toughness, carbon is added in an amount between 0.22% and 0.30%. In a preferred embodiment, carbon is added in an amount between 0.25% and 0.28%.

By adding manganese (Mn), full hardening or through hardening, as well as full tempering or through tempering can be improved. Furthermore, manganese also assists in solid solution hardening and thereby compensates a higher carbon amount, which in turn is required for the desired high strength. In addition, also the toughness can be increased by manganese. It has been found that with an addition of manganese in an amount between 0.7% and 1.2% the positive effects of manganese on the hardenability, the strength and the toughness can be achieved. In a preferred embodiment, manganese is added in an amount between 0.8% and 1.0%.

Silicon (Si) is normally added for purpose of deoxidizing during the production of the steel alloy. In addition, silicon increases the strength of the steel alloy. In order to avoid negative influence on the toughness of the steel alloy, silicon is present in the steel alloy in an amount between 0.13% and 0.38%. In a preferred embodiment, silicon is present in the steel alloy in an amount between 0.15% and 0.35%.

Chromium (Cr) is added in an amount between 0.7%-1.2%. In a preferred embodiment, chromium is added in an amount between 0.9% and 1.1%. Chromium, amongst other effects, improves the full hardening and full tempering of the steel pipe.

Molybdenum (Mo) is added in an amount between 0.5%-0.8%. In a preferred embodiment, molybdenum is added in an amount between 0.55% and 0.65%. Molybdenum, amongst other effects, improves the full hardening and full tempering of the steel pipe.

The steel alloy of the tubular steel body from which the seamless steel pipe is made may, in addition to the above mentioned alloying elements contain at least one of the following additional alloying elements: aluminum, niobium, titanium, boron, phosphor, sulfur, nickel, copper, tin, vanadium and nitrogen.

The additional alloying elements may be present in mass-% in the following ranges:

Al 0.025-0.060
Nb 0.02-0.06
Ti 0.02-0.06
B 0.001-0.01
P 0-0.18
S 0-0.006
Ni 0-0.3
Cu 0-0.3
Sn 0-0.03

V 0-0.02

N 0-0.018.

Nickel (Ni) and vanadium (V) assist in the formation of a fine structure so that the toughness of the steel alloy can be further increased.

Titanium (Ti), niobium (Nb) as well as vanadium (V) are preferably added in low amounts so that a fine starting structure before martensitic transformation can be generated.

The sulfur (S) amount, which may be present as an impurity, is limited to a maximum of 0.006% in order to positively influence the transverse notch impact toughness and workability.

Also phosphor (P), which may be present as impurity element, is limited to an amount of 0.18%.

Aluminum (Al), which is used as deoxidizing element during the steel making process, should only be present in the range of 0.025%-0.060%.

The seamless steel pipe according to the invention is for use in cases where internal pressure is applied. Application of internal pressure in this context is in particular an application, where high pressure is applied abruptly onto the steel pipe from within. Such applications include the usage of the seamless steel pipe as a hollow carrier of a perforation gun. Also other applications, where internal pressure is applied constantly or pulsating from within onto the steel pipe may be used in cases according to the present invention.

According to the present invention, the seamless steel pipe is produced by hardening and tempering a tubular steel body. In particular, the tubular steel body is being tempered at a holding temperature of at least 450° C.

In a preferred embodiment, the holding temperature during the tempering is below Ac1-temperature of the steel. And preferably, the holding time at the holding temperature during tempering is less than 8 min. The advantages of these heat treatment conditions in combination with the steel alloy which is being used, will be described later with respect to the inventive method.

The seamless steel pipe has a length extending between a first end and a second end. The seamless steel pipe has a high burst strength. In particular, the seamless steel pipe over at least part of the length has a yield strength Rp0.2 of >1050 MPa. Thereby, the 155 ksi grade can be exceeded and the seamless steel pipe can be applied as a hollow carrier of a perforation gun and also complies with requirements such as surrounding conditions of offshore bore holes.

In a preferred embodiment, the yield strength Rp0.2 over at least part of the length of the pipe is >1200 MPa. This high tensile strength can be obtained with the steel alloy used according to the invention and the manufacturing steps of the seamless steel pipe, in particular the holding temperature during tempering.

According to a preferred embodiment, the seamless steel pipe has a martensitic structure with at least 80% tempered martensite. The notch toughness determined according to the Charpy-Test at a longitudinal specimen is at least 50 J and at a transverse specimen is at least 28 J. In a further preferred embodiment, the notch toughness determined according to the Charpy-Test at a longitudinal specimen is at least 60 J and at a transverse specimen is at least 30 J. When use of the Charpy Test is indicated, the Charpy Test is performed according to the standard ASTM A370, with specimen measurements of 10×10×50 mm.

As indicated above, such high notch toughness, in particular in the transversal direction, is advantageous for the conditions to which the seamless steel pipe will be exposed, when for example being used as a hollow carrier for a perforation gun. In addition, the seamless steel pipe has to have high strength. According to a preferred embodiment, the product of yield strength Rp0.2 and notch toughness at 15° C. is between 42000 and 60760 MPa×Jcm$^2$.

These properties can be obtained with the steel alloy which is used according to the present invention and with the heat treatment which is applied to the tubular steel body, in particular the tempering holding temperature.

The seamless steel pipe has a grain structure after heat treatment and in particular after tempering with an average grain size of <15 μm. In a preferred embodiment, the average grain size of the grain structure of the seamless steel pipe after tempering is <10 μm. With such fine grain structure, the desired properties are achieved.

According to a preferred embodiment, the holding time at holding temperature during tempering is less than 8 minutes. It has been identified that even with this short holding time, a desired structure can be achieved which shows sufficient hardness and tensile strengths, as well as toughness to be employed in applications, such as for a hollow carrier of a perforating gun.

According to a further aspect, the present invention relates to a method of producing a high strength seamless steel pipe having a high burst strength and at least over part of the length having a yield strength Rp0.2>1050 MPa, the method comprising the steps of preparing a seamless tubular steel body of a steel alloy comprising, besides iron and inevitable impurities, the following alloying elements in mass-%:

C 0.22-0.30%

Mn 0.7-1.2%

Si 0.13-0.38%

Cr 0.7-1.2%

Mo 0.5-0.8%, the step of heat treating the tubular steel body with a holding temperature during tempering of >450° C., and wherein the seamless steel pipe has a grain structure after heat treatment with an average grain size of <15 μm.

Features and advantages which have been described with respect to the inventive seamless steel pipe—where applicable—also refer to the inventive method and vice versa.

The heat treatment according to the present invention in particular comprises the steps of hardening and tempering. For the hardening step the tubular steel body is heated to an annealing temperature and is cooled, in particular quenched. For tempering, the steel pipe is heated to a holding temperature and is subsequently cooled.

The holding temperature for tempering, according to the present invention, is at least 450° C. and preferably lower than the Ac1-temperature of the steel alloy.

According to a preferred embodiment, the steel pipe is heated to the holding temperature of tempering by inductive heating. This way of heating the steel pipe has the advantages that a fast heating can be achieved and the grain structure obtained after tempering is homogeneous.

According to a preferred embodiment, the steel pipe is heated to annealing temperature from which it is cooled for hardening, by inductive heating. Preferably both, heating to annealing temperature and heating to tempering temperature are performed by inductive heating. By heating the steel pipe to annealing temperature and holding at the temperature with inductive heating, a full annealing or through annealing can be achieved.

According to one embodiment, the steel pipe is brought to tempering temperature with a heating rate between 20 and 200 K/s followed by a holding phase at the holding temperature. The holding time is preferably less than 8 minutes.

According to another aspect, the invention relates to usage of a seamless steel pipe as an outer pipe of perforation guns, in particular a hollow carrier of perforation guns. Preferably the outer pipe, in particular the hollow carrier, has a martensitic structure with at least 80% tempered martensite and the notch toughness determined according to Charpy-Test at a longitudinal specimen is at least 50 J and at a transverse specimen is at least 28 J. According to a further preferred embodiment, the notch toughness determined according to Charpy-Test at a longitudinal specimen is at least 60 J and at a transverse specimen is at least 30 J.

A hollow carrier for a perforation gun according to the present invention is preferably a steel pipe with rated or predetermined breaking points and with shaped charges positioned within the steel pipe.

Using an inventive seamless steel pipe as an outer pipe of a perforation gun is advantageous as the properties which are provided by the inventive steel pipe can advantageously be used. In particular, the high yield strength of >1200 MPa allows for sustaining the pressure which is applied during the positioning and also the activation of the perforation gun. In addition, due to the steel alloy which is used for the seamless steel pipe and the heat treatment performed on the tubular steel body for producing the inventive seamless steel pipe, brittle breakage of the steel pipe during activation of the perforation gun can be avoided.

According to another aspect, the present invention relates to a perforation gun for perforation of borehole casings comprising a charging unit and an outer hollow carrier enclosing the charging unit. The perforation gun is characterized in that the hollow carrier is made of a seamless steel pipe formed in accordance with the present invention.

In FIG. 1, a schematic view of a perforation gun 1 in the area of a hollow carrier 10 is shown. Hollow carrier 10 is a seamless steel pipe wherein rated or predefined break points 100 are provided. Break points 100 are distributed over the length of hollow carrier 10 (i.e., the seamless steel pipe). Break points 100, in the embodiment shown in FIG. 1, are round recesses in the outer wall of hollow carrier 10 which do not extend over the entire wall thickness of hollow carrier 10. Inside hollow carrier 10, a charging unit 11 is provided. Charging unit 11 is provided to ignite explosive material and thus perform the actual perforation process.

With the present invention hollow carriers can be provided, which have minimum yield strength of 1206 MPa (175 ksi) while at the same time having a sufficient toughness, which can be used for manufacturing perforation guns for the offshore conditions. In offshore conditions, high temperatures of 200° C. and ambient pressure of 200 bar may be present.

In general, the seamless steel pipe according to the invention may be manufactured by cold drawing or hot drawing. It has been found out that the toughness which can be achieved, however, is better with hot drawn steel pipes.

The core of the invention is the usage of the appropriate steel alloy, from which the tubular steel body is made, in combination with an inductive tempering at tempering specific conditions, in particular at temperatures between 450° C. and the Ac1 temperature, for obtaining the corresponding mechanical characteristic values, in particular tensile strength and notch toughness.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A perforation gun for perforation of borehole casings comprising a charging unit and an outer hollow carrier enclosing the charging unit, characterized in that the hollow carrier is made of a seamless steel pipe, the seamless steel pipe having been produced by tempering a tubular steel body at a holding temperature of >450° C., the seamless steel pipe having a length extending between a first end and a second end, the seamless steel pipe having a high burst strength and at least over part of the length having a yield strength Rp0.2 of >1050 MPa, and the seamless steel pipe having a grain structure with an average grain size of <15 μm, and the tubular steel body having been manufactured from a steel alloy, which steel alloy comprises, besides iron and inevitable impurities, the following alloying elements in mass-%:

C 0.22-0.30%
Mn 0.8-1.0%
Si 0.13-0.38%
Cr 0.7-1.2%
Mo 0.5-0.8%;

wherein the steel alloy further comprises at least one of the following additional alloying elements: aluminum, niobium, titanium, boron, phosphor, sulfur, nickel, copper, tin, vanadium and nitrogen;

wherein the at least one additional alloying elements are present in mass-% in the following ranges:

Al 0.025-0.060
Nb 0.02-0.06
Ti 0.02-0.06
B 0.001-0.01
P 0-0.18
S 0-0.006
Ni 0-0.3
Cu 0-0.3
Sn 0-0.03
V 0-0.02
N 0-0.018;

wherein the seamless steel pipe has a martensitic structure with at least 80% tempered martensite; and wherein a holding time at the holding temperature during tempering is <8 min.

2. A perforation gun according to claim 1, characterized in that the yield strength Rp0.2 over at least part of the length of the pipe is >1200 MPa.

3. A perforation gun according to claim 2 characterized in that the product of yield strength Rp0.2 and a notch toughness at 15° C. is between 42000 and 60760 MPa×Jcm$^2$.

4. A perforation gun according to claim 1, characterized in that a notch toughness determined according to a Charpy Test at a longitudinal sample is at least 50 J and at a transverse specimen is at least 28 J.

5. A perforation gun according to claim 4, characterized in that the notch toughness determined according to the Charpy Test at a longitudinal specimen is at least 60 J and at a transverse specimen is at least 30 J.

6. A perforation gun according to claim 1, characterized in that the holding temperature during the tempering of heat treatment is below Ac1-temperature of the steel alloy.

7. A perforation gun according to claim 1, characterized in that the grain structure of the seamless steel pipe after heat treatment has an average grain size of <10 μm.

8. A perforation gun according to claim 1, characterized in that the steel alloy comprises molybdenum in the amount of 0.55-0.65%.

9. A perforation gun according to claim 1, characterized in that the steel alloy comprises nickel in the amount of 0-0.3%.

10. A perforation gun according to claim 1 wherein the product of yield strength Rp0.2 and a notch toughness at 15° C. is between 42000 and 60760 MPa×Jcm$^2$.

* * * * *